United States Patent
Nonaka et al.

(10) Patent No.: US 8,004,204 B2
(45) Date of Patent: Aug. 23, 2011

(54) POWER CIRCUIT AND ILLUMINATION APPARATUS

(75) Inventors: Takafumi Nonaka, Tokyo (JP); Takashi Kumagai, Tokyo (JP); Noriyuki Matsubara, Tokyo (JP); Kazuo Ban, Tokyo (JP); Koichi Saito, Tokyo (JP)

(73) Assignees: Mitsubishi Electric Corporation, Chiyoda-Ku, Tokyo (JP); Mitsubishi Electric Lighting Corporation, Kamakura-Shi, Kanagawa-Ken (JP)

( * ) Notice: Subject to any disclaimer, the term of this patent is extended or adjusted under 35 U.S.C. 154(b) by 246 days.

(21) Appl. No.: 12/484,265

(22) Filed: Jun. 15, 2009

(65) Prior Publication Data
US 2010/0194307 A1   Aug. 5, 2010

(30) Foreign Application Priority Data
Feb. 5, 2009   (JP) ................. 2009-024752

(51) Int. Cl.
*H05B 41/16* (2006.01)
(52) U.S. Cl. .......... 315/274; 315/312; 315/185 S; 315/291; 315/247

(58) Field of Classification Search ............ 315/291, 315/297, 307–324, 224, 225, 247, 274, 276–279, 315/185 S
See application file for complete search history.

(56) References Cited

U.S. PATENT DOCUMENTS

| | | |
|---|---|---|
| 2002/0181259 A1 | 12/2002 | Duerbaum et al. |
| 2002/0186026 A1 | 12/2002 | Elferich |
| 2003/0067791 A1 | 4/2003 | Elferich et al. |
| 2004/0170030 A1 | 9/2004 | Duerbaum et al. |

FOREIGN PATENT DOCUMENTS

| | | |
|---|---|---|
| JP | 11-341795 | 12/1999 |
| JP | 2002-244103 | 8/2002 |
| JP | 2002-244103 A | 8/2002 |
| JP | 2002-374674 | 12/2002 |
| JP | 2003-111408 | 4/2003 |
| JP | 2004-111104 | 4/2004 |

*Primary Examiner* — Tuyet Thi Vo
(74) *Attorney, Agent, or Firm* — Buchanan Ingersoll & Rooney PC

(57) ABSTRACT

A series load circuit is a circuit formed by connecting a light-emitting device unit 851 (the first load circuit) and a light-emitting device unit 852 (the second load circuit) in series. A voltage generating circuit 111 generates voltage to be applied to the series load circuit. A current detecting circuit 112 detects electric current flowing through the light-emitting device unit 851. A controlling circuit 114 controls the voltage generating circuit 111 so that the electric current detected by the current detecting circuit 112 becomes a predetermined current value.

6 Claims, 7 Drawing Sheets

POWER CIRCUIT AND ILLUMINATION APPARATUS

BACKGROUND OF THE INVENTION

1. Field of the Invention

The present invention relates to a power circuit supplying electric power to plural load circuits having different driving currents.

2. Discussion of the Background

When plural loads exist to be controlled by constant current such as LED (light-emitting diode), if driving currents of the plural loads are the same, a load circuit is formed by connecting the plural loads in series and connected to a power circuit, and the same current is passed to the plural loads.

If the driving currents of the plural loads are different, the plural loads are grouped for each driving current, plural load circuits are formed by connecting only loads having the same driving current in series, and the plural load circuits are respectively connected to different power circuits.

Some configurations of the power circuit are known such as a configuration in which each resistance connected with each load in series is connected to a common power circuit to limit driving current to be supplied to each load; and a configuration in which feedback of driving current is performed and constant current driving control is carried out using buck converters, etc.

LIST OF REFERENCES

[Patent Document 1] JP 2002-244103

Conventionally, when plural loads having different driving currents are driven, it is necessary to provide a configuration to control current by resistance using a common power circuit, or provide different constant current driving circuits for respective loads.

As for the configuration in which each resistance connected with each load in series is connected to the common power circuit, the configuration is simple, so that downsizing of the circuit and reduction of the manufacturing cost can be done; on the contrary, the power efficiency is bad.

Further, as for the configuration using the constant current driving circuit such as a buck converter for each, the power efficiency is high; on the contrary, the configuration is complicated, so that the circuit size increases, and the manufacturing cost is high.

The present invention is provided to solve, for example, the above problems and aims to lower the manufacturing cost, increase the power efficiency, and improve the reliability in the power circuit supplying electric power to plural load circuits having different driving currents.

SUMMARY OF THE INVENTION

According to the present invention, in a power circuit for supplying electric power to a first load circuit driven by a first driving current and a second load circuit driven by a second driving current that is larger than the first driving current, the power circuit includes a transformer, a constant current circuit, and a current adding circuit; the transformer includes a first winding and a second winding; the constant current circuit includes a voltage generating circuit, a current detecting circuit, and a controlling circuit, and supplies the first driving current to a series load circuit in which the first load circuit and the second load circuit are electrically connected in series; the current adding circuit obtains energy from electric current flowing through the second winding and supplies electric current having a current value corresponding to a difference between the first driving current and the second driving current to the second load circuit; the voltage generating circuit obtains energy from electric current flowing through the first winding and generates voltage to be applied to the series load circuit; the current detecting circuit treats either of the first load circuit and the second load circuit as a current detection target circuit and detects electric current flowing through the current detection target circuit; and the controlling circuit controls the voltage generating circuit so that electric current detected by the current detecting circuit becomes a predetermined current value.

BRIEF DESCRIPTION OF THE DRAWINGS

A complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Embodiment 1

The first embodiment will be explained with reference to FIGS. 1 through 5.

Figure 1:
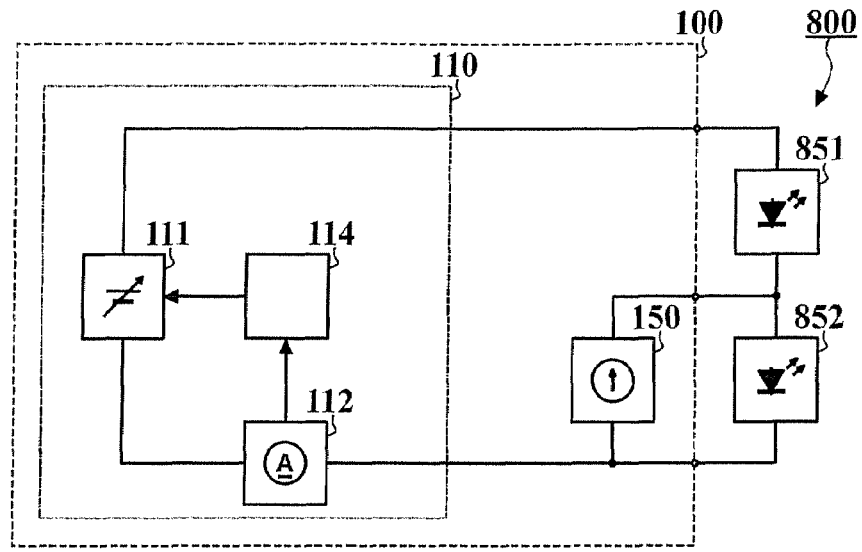
FIG. 1 is a block configuration diagram showing a configuration of a function block configuration of an illumination apparatus 800 according to the first embodiment.

FIG. 1 is a block configuration diagram showing one example of a function block configuration of an illumination apparatus 800 according to the present embodiment.

The illumination apparatus 800 includes plural types of light-emitting devices such as a white LED and a red LED, for example. The illumination apparatus 800 mixes light emitted by the plural types of light-emitting devices and emits light having high color rendering properties with a desired color temperature such as warm white.

The light-emitting device has different electric characteristics for each type; for example, a driving current value varies.

The illumination apparatus 800 includes plural light-emitting device units 851 and 852 and a power circuit 100.

Each of the light-emitting device units 851 and 852 (a load circuit, a light-emitting device series circuit) includes a single type of light-emitting device. If the light-emitting device units 851 and 852 include plural light-emitting devices, the light-emitting devices are electrically connected in series with each other.

The power circuit 100 supplies electric power for lighting the light-emitting device units 851 and 852 to the light-emitting device units 851 and 852. The power circuit 100 includes a constant current circuit 110 and a current adding circuit 150.

The constant current circuit 110 supplies electric current to a circuit (referred to as "a series load circuit", hereinafter) which is formed by electrically connecting plural light-emitting device units 851 and 852 in series.

The current adding circuit 150 supplies electric current to the light-emitting device unit 852 which is one of the plural light-emitting device units 851 and 852.

In this example, the light-emitting device unlit 851 (a first load circuit) is flowed through by electric current supplied from the constant current circuit 110, and the light-emitting device unit 852 (a second load circuit) is flowed through by electric current made by combining electric current supplied from the constant current circuit 110 with electric current supplied from the current adding circuit 150.

Therefore, the constant current circuit 110 generates electric current having a driving current value ("first driving current", hereinafter) for lighting the light-emitting device of the light-emitting device unit 851 with a desired brightness. Further, the current adding circuit 150 supplies electric current having a current value of a difference between driving current value ("second driving current", hereinafter) for lighting the light-emitting device of the light-emitting device unit 852 with a desired brightness and the first driving current.

By the above operation, the light-emitting device unit 851 is flowed through by the first driving current, and the light-emitting device unit 852 is flowed through by the second driving current, so that each light-emitting device is lit with desired brightness. Desired color temperature is obtained by combining light-emitting outputs of these light-emitting devices.

The constant current circuit 110 includes a voltage generating circuit 111, a current detecting circuit 112, and a controlling circuit 114.

The voltage generating circuit 111 generates voltage to be applied to the series load circuit.

The current detecting circuit 112 detects electric current flowing through the light-emitting device unit 851. Here, the current detecting circuit 112 can be configured to detect electric current flowing through the light-emitting device unit 852 instead of the light-emitting device unit 851. Hereinafter, a circuit which is a target for detecting the electric current by the current detecting circuit 112 is called as a current detection target circuit.

The controlling circuit 114 controls the voltage generating circuit 111 based on the electric current detected by the current detecting circuit 112. Concretely, the controlling circuit 114 adjusts voltage generated by the voltage generating circuit 111 so as that the electric current detected by the current detecting circuit 112 becomes a predetermined current value ("target current value", hereinafter). Namely, when the electric current detected by the current detecting circuit 112 is less than the predetermined current value (target current value), the controlling circuit 114 performs control by making the voltage to be generated by the voltage generating circuit 111 higher, to cause the electric current flowing through the current detecting circuit 112 to increase and approach to the predetermined current value (target current value). On the contrary, when the electric current detected by the current detecting circuit 112 exceeds the predetermined current value (target current value), the controlling circuit 114 performs control by making the voltage to be generated by the voltage generating circuit 111 lower, to cause the electric current flowing through the current detecting circuit 112 to decrease and approach to the predetermined current value (target current value).

In this example, the target current value is the first driving current. Further, when the current detection target circuit is the light-emitting device unit 852, the target current value is the second driving current.

Figure 2:
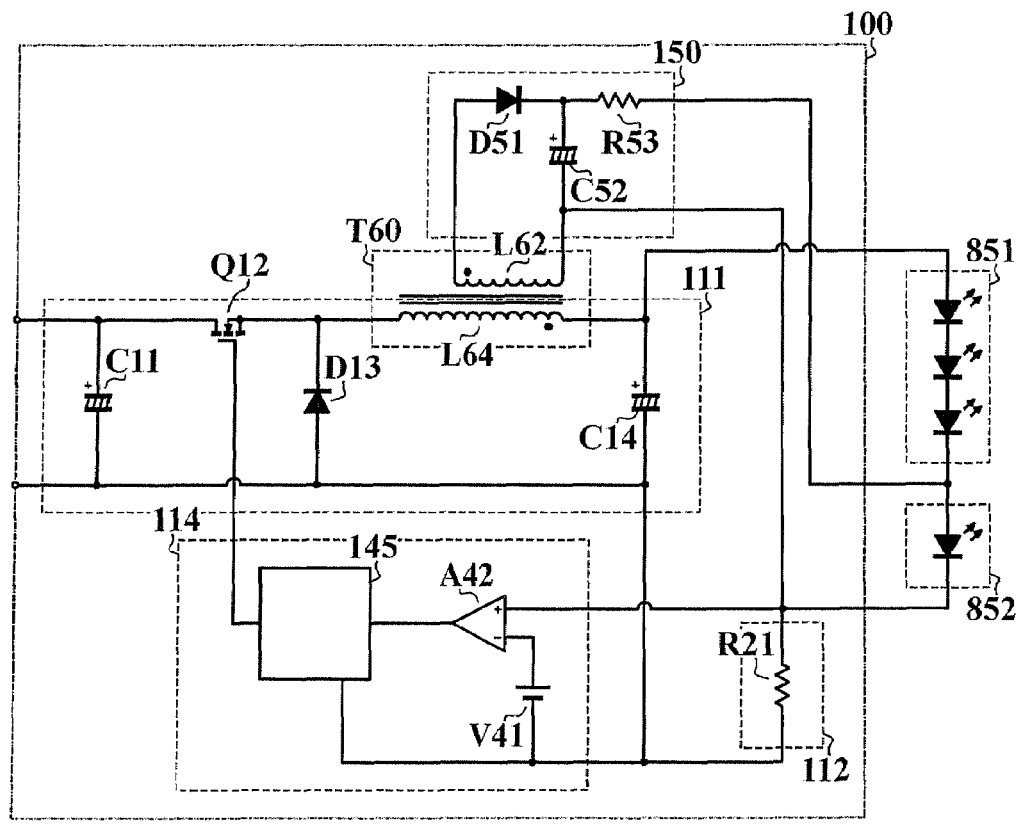
FIG. 2 is an electric circuit diagram showing a circuit configuration of a power circuit 100 according to the first embodiment.

FIG. 2 is an electric circuit diagram showing a circuit configuration of the power circuit 100 according to the present embodiment.

The power circuit 100 inputs direct voltage or pulsating flow voltage, and supplies electric power to the light-emitting device units 851 and 852.

The voltage generating circuit 111 is non-insulated switching power source such as a buck converter (a step-down chopper circuit), for example. The voltage generating circuit 111 includes an input capacitor C11, a switching device Q12, a rectifying device D13, a transformer T60, and a smoothing capacitor C14. The voltage generating circuit 111 inputs direct voltage or pulsating flow voltage and generates step-down voltage.

The input capacitor C11 is electrically connected between input terminals of the voltage generating circuit 111. The input capacitor C11 inputs power source.

The switching device Q12 opens/closes according to a signal showing an instruction from the controlling circuit 114. The switching device Q12 is a MOSFET, for example. One end of the switching device Q12 is electrically connected to a positive terminal of the input capacitor C11. The other end of the switching device Q12 is electrically connected to a cathode terminal of the rectifying device D13. An anode terminal of the rectifying device D13 is electrically connected to a negative terminal of the input capacitor C11 and a negative terminal of the smoothing capacitor C14. The switching device Q12 carries out switching of inputted voltage and makes necessary energy transmitted to the transformer T60.

The rectifying device D13 makes energy accumulated in a primary winding L64 (the first winding) of the transformer T60 free-wheel.

The transformer T60 includes the primary winding L64 (the first winding) and a secondary winding L62 (the second winding). Between these, the primary winding L64 forms the voltage generating circuit 111. The primary winding L64 carries out operation corresponding to a choke coil of a DC/DC converter. One end of the primary winding L64 is electrically connected to a connecting point of the switching device Q12 and the rectifying device D13. The other end of the primary winding L64 is electrically connected to the positive terminal of the smoothing capacitor C14. The transformer T60 transmits electric power from the input side to the output side.

The positive terminal of the smoothing capacitor C14 is electrically connected to a terminal of the positive side of the series load circuit (a terminal of the positive side of the light-emitting device unit 851). The negative terminal of the smoothing capacitor C14 is electrically connected to a terminal of the negative side of the series load circuit (a terminal of the negative side of the light-emitting device unit 852) through the voltage detecting circuit 112. The smoothing capacitor C14 smoothes output of the primary winding L64 (the first winding) of the transformer T60.

The voltage generated between both ends of the smoothing capacitor C14 is applied to the series load circuit.

The current adding circuit 150 includes a rectifying device D51, a smoothing capacitor C52, and a current limiting resistance R53.

An anode terminal of the rectifying device D51 is electrically connected to one end of the secondary winding L62. A cathode terminal of the rectifying device D51 is electrically connected to a positive terminal of the smoothing capacitor C52 and one end of the current limiting resistance R53. A negative terminal of the smoothing capacitor C52 is electrically connected to the other end of the secondary winding L62 and a terminal of a negative side of the light-emitting device unit 852. The other end of the current limiting resistance R53 is electrically collected to a terminal of a positive side of the light-emitting device unit 852. Namely, the light-emitting device unit 852 is connected to the secondary winding L62 (the second winding) of the transformer T60 through the current limiting resistance R53 (a current limiting circuit).

The rectifying device D51 rectifies an output of the secondary winding L62 of the transformer T60. The smoothing capacitor C52 smoothes an output of the secondary winding L62 rectified by the rectifying device D51. The current limiting resistance R53 limits electric current which flows into the light-emitting device unit 852. The electric current which discharges the smoothing capacitor C52 is limited by the current limiting resistance R53 (the current limiting circuit), and flows through the light-emitting device unit 852.

The current detecting circuit 112 includes a resistance R21. One end of the resistance R21 is electrically connected to a terminal of the negative side of the series load circuit (the terminal of the negative side of the light-emitting device unit 852). The other end of the resistance R21 is electrically connected to an output terminal of the negative side of the voltage generating circuit 111. The electric current flowing through the resistance R21 is the same as the electric current flowing through the light-emitting device unit 851, and voltage which is generated between both ends of the resistance R21 is proportional to the electric current flowing through the resistance R21. The current detecting circuit 112 outputs the voltage generated between both ends of the resistance R21, as the current detection voltage.

The controlling circuit 114 includes a reference voltage supply V41, a differential amplifier A42, and a control IC 145.

The reference voltage supply V41 generates voltage of a voltage value which is a reference voltage.

The differential amplifier A42 (an error amplifier) carries out calculation based on the voltage generated at the resistance R21 (a current detecting resistor) and the voltage of the reference voltage supply V41, and outputs an output signal to the control IC 145. (The differential amplifier A42 compares the current detection voltage outputted by the current detecting circuit 112 with the voltage value of the voltage generated by the reference voltage supply V41, and outputs a signal showing the compared result.)

The control IC 145 controls an opening/closing ratio of the switching device Q12 based on the signal outputted by the differential amplifier A42.

When the switching device Q12 turns ON, a voltage corresponding to a difference between a voltage between both ends of the input capacitor C11 and a voltage between both ends of the smoothing capacitor C14 is applied between both ends of the primary winding L64. If the voltage between both ends of the input capacitor C11 is larger, the electric current (input current) directed for charging the smoothing capacitor C14 flows through the primary winding L64 and the electric current increases. At this time, although an inverse voltage is generated between both ends of the secondary winding L62, the electric current does not flow through the secondary winding L62 because of the operation of the rectifying device D51.

When the switching device Q12 turns OFF, the rectifying device D13 turns ON to maintain the magnetic flux, the electric current (free-wheeling current) flowing through the primary winding L64 is maintained, and the smoothing capacitor C14 is further charged. Namely, the ON-ON operation is carried out where the electric current for charging the smoothing capacitor C14 flows when the switching device Q12 is ON and also OFF.

At this time, the polarities of voltage generated between both ends of the secondary winding L62 are reversed, and if the voltage is higher than the voltage between both ends of the smoothing capacitor C52, the rectifying device D51 turns ON, and electric current flows through the secondary winding L62.

The voltage applied between both ends of the primary winding L64 is approximately equal to inverted voltage of the voltage between both ends of the smoothing capacitor C14, so that the electric current flowing through the primary winding L64 decreases. Further, the electric current flowing through the secondary winding L62 is directed oppositely to the polarities of voltage between both ends of the secondary winding L62, so that the electric current flowing through the secondary winding L62 also decreases.

By repeating these operations, throughout the period including ON period and OFF period of the switching device Q12, the electric power is transmitted through the primary winding L64 from the input side (the input capacitor C11) to the output side (the smoothing capacitor C14). Further, during the OFF period of the switching device Q12, the electric power is transmitted from the primary side (the primary winding L64) to the secondary side (the secondary winding L62) of the transformer T60.

The value of voltage charged to the smoothing capacitor C14 is a voltage value obtained by multiplying a rate of the ON period of the switching device Q12 to the value of voltage between both ends of the input capacitor C11. Further, the value of voltage charged to the smoothing capacitor C52 is a voltage value obtained by multiplying a turn ratio between the secondary winding L62 and the primary winding L64 to the voltage between both ends of the input capacitor C11.

Based on the signal outputted by the differential amplifier A42, if the current detection voltage outputted by the current detecting circuit 112 is lower than the reference voltage value of the reference voltage supply V41, namely, if the electric current detected by the current detecting circuit 112 is less than a predetermined current value, the control IC 145 increases a ratio of the period (On duty) in which the switching device Q12 is ON, thereby raising the voltage between both ends of the smoothing capacitor C14. This causes a rise of the voltage applied to the series load circuit, and an increase of the electric current flowing through the series load circuit.

On the contrary, if the current detection voltage outputted by the resistance R21 is higher than the reference voltage value of the reference voltage supply V41, namely, if the electric current detected by the current detecting circuit 112 is more than the predetermined current value, the control IC 145 decreases the ratio of the period in which the switching device Q12 is ON, thereby lowering the voltage between both ends of the smoothing capacitor C14. This causes a lowering of the voltage applied to the series load circuit, and a decrease of the electric current flowing through the series load circuit.

In this way, the controlling circuit 114 adjusts the voltage generated by the voltage generating circuit 111 so that the electric current flowing through the current detecting circuit 112 becomes a predetermined current (target current value).

The output voltage of the voltage generating circuit 111 makes driving current flow through the series load circuit (the light-emitting device units 851, 852). The controlling circuit 114 controls the opening/closing ratio of ON/OFF of the switching device Q12 of the voltage generating circuit 111 so that the driving current detected by the current detecting circuit 112 accords to the target current value. By this operation, the constant current circuit 110 (which is composed of the voltage generating circuit 111, the current detecting circuit 112, and the controlling circuit 114) works as a constant current driving circuit which makes a predetermined current (a target current value; in the present embodiment, the first driving current) flow through the series load circuit (the light-emitting device series circuit).

In the present embodiment, the first load circuit (the light-emitting device unit 851) and the second load circuit (the light-emitting device unit 852) which form the series load circuit (the light-emitting device series circuit) are respectively flown through by the first driving current and the second driving current. Since the second driving current is a current value obtained by adding the deficient current value to the first driving current by the current adding circuit 150, the constant current circuit 110 can drive the series load circuit (light-emitting device series circuit) with the first driving current.

Therefore, in the present embodiment, the target current value of the constant current supplied by the constant current circuit 110 is the first driving current, and thus the current detection target circuit of the current detecting circuit 112 is the first load circuit (the light-emitting device unit 851) driven with the first driving current.

The series load circuit (the light-emitting device series circuit) is formed by connecting plural light-emitting device units 851 and 852 in series. The first light-emitting device unit 851 makes a main light emitting output. The second light-emitting device unit 852 makes an auxiliary light emitting output. In the light-emitting device unit 851, for example, four white light-emitting diodes are connected in series. It is sufficient that the light emitting output of the light-emitting device unit 852 is small, since the output is auxiliary. So, for example, one red light-emitting diode is used for the light-emitting device unit 852. In order to obtain necessary lighting output, the white light-emitting diode is driven with the driving current of, for example, 350 mA (the first driving current), and the red light-emitting diode is driven with the driving current of, for example, 400 mA (the second driving current). Namely, the electric current for driving the light-emitting device unit 852 (the second driving current) is 50 mA larger than the electric current for driving the light-emitting device unit 851 (the first driving current).

The electric current supplied from the voltage generating circuit 111 flows through the light-emitting device unit 851, the light-emitting device unit 852, and the current detecting circuit 112, and returns to the voltage generating circuit 111. Further, the electric current supplied from the current adding circuit 150 flows through the light-emitting device unit 852 and returns to the current adding circuit 150. Therefore, only the electric current supplied from the voltage generating circuit 111 flows through the light-emitting device unit 851 and the current detecting circuit 112; on the other hand, the electric current made by combining the electric current supplied from the voltage generating circuit 111 and the electric current supplied from the current adding circuit 150 flows through the light-emitting device unit 852.

In the present embodiment, the constant current circuit 110 supplies the first driving current (350 mA) flowing through the light-emitting device units 851 and 852, and deficient current of 50 mA is added from the current adding circuit 150 only to the light-emitting device 852 so that the electric current flowing through the light-emitting device 852 becomes the second driving current (400 mA).

Figure 3:
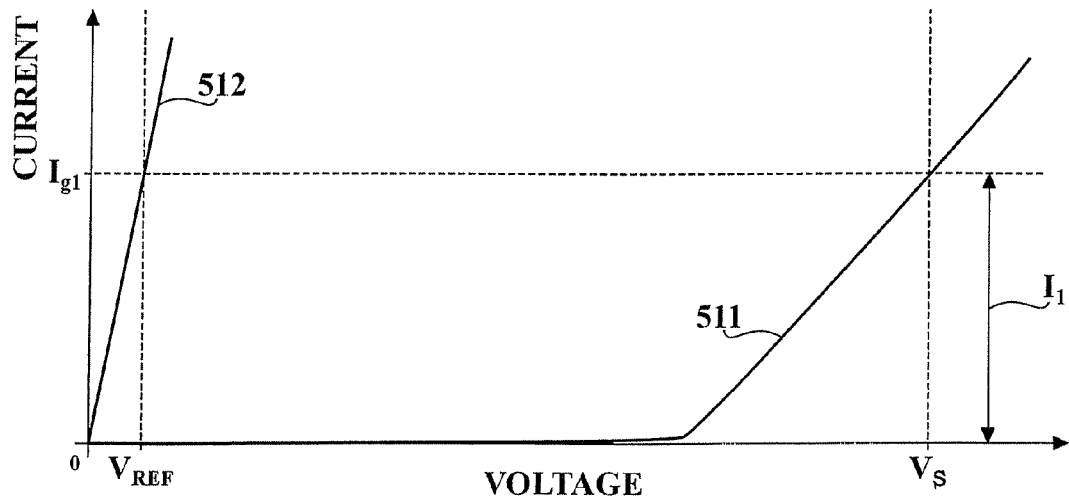
FIG. 3 shows volt-ampere characteristic of a series load circuit and a current detecting circuit 112 according to the first embodiment.

FIG. 3 shows volt-ampere characteristic of the series load circuit and the current detecting circuit 112 according to the present embodiment.

The horizontal axis shows the voltage between both ends of the series load circuit and that of the current detecting circuit 112. The vertical axis shows the electric current flowing through the series load circuit and that of the current detecting circuit 112. A curved line 511 shows the volt-ampere characteristic of the series load circuit. A straight line 512 shows the volt-ampere characteristic of the current detecting circuit 112.

The controlling circuit 114 controls the voltage generated by the voltage generating circuit 111 so that the current detection voltage outputted by the current detecting circuit 112 matches a reference voltage value $V_{REF}$ of the reference voltage supply V41. If the voltage generated by the voltage generating circuit 111 is adjusted to a voltage value $V_S$, the electric current $I_1$ flowing through the series load circuit becomes a current value $I_{g1}$, and the current detection voltage outputted by the current detecting circuit 112 matches the reference voltage value $V_{REF}$. The current value $I_{g1}$ at this time is the target current value.

Figure 4:
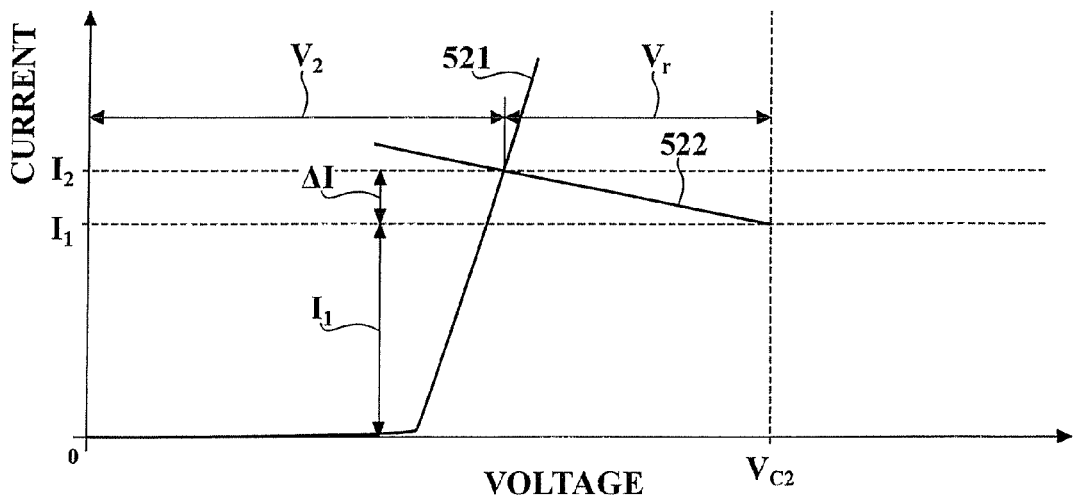
FIG. 4 shows volt-ampere characteristic of a light-emitting device unit 852 and a current limiting resistance R53 according to the first embodiment.

FIG. 4 shows one example of volt-ampere characteristic of the light-emitting device unit 852 and the current limiting resistance R53 according to the present embodiment.

The horizontal axis shows the voltage between both ends of the light-emitting device unit 852 and that of the current limiting resistance R53. The vertical axis shows the electric current flowing through the light-emitting device unit 852 and that of the current limiting resistance R53. A curved line 521 shows the volt-ampere characteristic of the light-emitting device unit 852. A straight line 522 shows the volt-ampere characteristic of the current limiting resistance R53 with a voltage value $V_{C2}$ and a current value $I_1$ as origin.

By adjusting the voltage generated by the voltage generating circuit 111 to the voltage value $V_S$, the voltage charged to the smoothing capacitor C52 becomes the voltage value $V_{C2}$ obtained by multiplying a ratio determined by the turn ratio of the transformer T60 to the voltage value $V_S$. This is divided between the current limiting resistance R53 and the light-emitting device unit 852, so that the voltage between both ends of the current limiting resistance R53 becomes the voltage value $V_r$, and the voltage between both ends of the light-emitting device unit 852 becomes the voltage value $V_2$. The electric current ΔI is supplied from the current adding circuit 150 to the light-emitting device unit 852, and the electric current $I_2$ made by combining with the electric current $I_1$ supplied from the voltage generating circuit 111 flows through the light-emitting device unit 852.

If a forward voltage of the series load circuit increases, the curved line 511 is moved in the right direction, so that the voltage value $V_S$ generated by the voltage generating circuit 111 increases. According to this, the voltage value $V_{C2}$ of the voltage charged to the smoothing capacitor C52 also increases, and the straight line 522 is moved in the right direction. Therefore, an intersecting point of the curved line 521 and the straight line 522 is moved along the curved line 521 in the upper right direction, and the current value $I_2$ increases.

Further, if a forward voltage of the light-emitting device unit 852 increases, the curved line 521 is moved in the right direction, so that the intersecting point of the curved line 521 and the straight line 522 is moved along the straight line 522 in the lower right direction, and the current value 12 decreases.

Since the current adding circuit 150 is simply configured using the current limiting resistance R53, the electric current ΔI to be supplied is not always constant. However, since the electric current flowing through the light-emitting device unit 852 is the electric current $I_2$ made by combining the electric current $I_1$ supplied from the voltage generating circuit 111 and the electric current ΔI supplied from the current adding circuit 150, an error of the electric current flowing through the light-emitting device unit 852 is small. For example, when the electric current $I_1$ is 350 mA and the electric current ΔI is 50 mA, if the error of the electric current ΔI is ±10%, that is ±5 mA, and thus the error of the electric current flowing through the light-emitting device unit 852 is merely ±1.3%.

In this way, since it is sufficient that the stability of the electric current to be generated is low, the current adding circuit 150 can be implemented with a relatively simple configuration, so that it is possible to reduce the number of components of the power circuit 100, decrease the manufacturing cost, and improve the reliability.

Figure 5A:
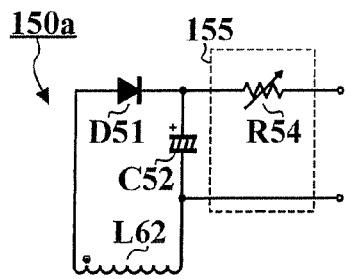
FIGS. 5A and 5B show deformed examples of a current adding circuit 150 according to the first embodiment.
Figure 5B:
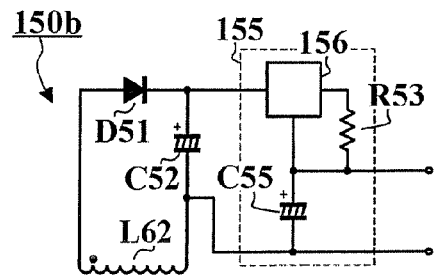

FIGS. 5A and 5B show deformed examples of a current adding circuit 150 according to the present embodiment.

A current adding circuit 150a shown in FIG. 5A includes a variable resistance R54 as the current limiting circuit 155 instead of the current limiting resistance R53. By making the current limiting circuit 155 variable resistance, the current value of the electric current ΔI supplied by the current adding circuit 150 can be adjusted arbitrarily. Therefore, the electric current flowing through the light-emitting device unit 852 can be adjusted, and by adjusting an output of the light-emitting device of the light-emitting device unit 852, it is possible to change the color of light emitted by the illumination apparatus 800.

A current adding circuit 150b shown in FIG. 5B includes a constant current circuit as the current limiting circuit 155. The constant current circuit includes, for example, a three-terminal regulator 156, a current limiting resistance R53, and a smoothing capacitor C55. An input terminal of the three-terminal regulator 156 is electrically connected to the positive terminal of the smoothing capacitor C52. The current limiting resistance R53 is electrically connected between an output terminal and an adjustment terminal of the three-terminal regulator 156. The smoothing capacitor C55 is electrically connected between the adjustment terminal of the three-terminal regulator 156 and the negative terminal of the smoothing capacitor C52. The current limiting circuit 155 outputs the electric current whose value is obtained by dividing the voltage value of the output voltage of the three-terminal regulator 156 by the resistance value of the current limiting resistance R53.

In this way, by using the constant current circuit as the current limiting circuit 155, the stability of the electric current outputted by the current adding circuit 150 can be improved.

Further, the current limiting circuit 155 can have another circuit configuration using the three-terminal regulator 156.

The power circuit 100 according to the present embodiment supplies electric power to the first load circuit (the light-emitting device unit 851) operated by the first driving current and the second load circuit (the light-emitting device unit 852) operated by the second driving current which is larger than the first driving current.

The power circuit 100 includes the transformer T60, the constant current circuit 110, and the current adding circuit 150.

The transformer T60 includes the first winding (primary winding L64) and the second winding (secondary winding L62).

The constant current circuit 110 includes the voltage generating circuit 111, the current detecting circuit 112, and the controlling circuit 114, and supplies a predetermined current $I_1$ (in the present embodiment, the first driving current) to a series load circuit formed by electrically connecting the first load circuit (the light-emitting device unit 851) and the second load circuit (the light-emitting device unit 852) in series.

The current adding circuit 150 obtains energy from the electric current flowing through the second winding (secondary winding L62) and supplies the electric current ΔI of the electric value corresponding to a difference between the first and second driving currents to the second load circuit (the light-emitting device unit 852).

The voltage generating circuit 111 obtains energy from the electric current flowing through the first winding (the primary winding L64) and generates voltage to be applied to the series load circuit.

The current detecting circuit 112 treats either of the first load circuit (the light-emitting device unit 851) and the second load circuit (the light-emitting device unit 852) as a current detection target circuit and detects the driving current flowing through the current detection target circuit.

The controlling circuit 114 controls the voltage generating circuit 111 so that the electric current detected by the current detecting circuit 112 becomes the predetermined current value (in the present embodiment, the first driving current).

According to the power circuit 100 of the present embodiment, the constant current circuit 110 supplies the electric current to the series load circuit formed by connecting plural load circuits in series, and the current adding circuit 150 supplies deficient current to one or some of the plural load circuits. Since output voltage and output current of the current adding circuit 150 are both small, the current adding circuit 150 can be implemented with a simple configuration.

According to the power circuit 100 of the present embodiment, the constant current circuit 110 supplies the first driving current to the series load circuit (the light-emitting device series circuit) formed by electrically connecting plural load circuits having different driving currents (the light-emitting device units 851 and 852) in series, and the current adding circuit 150 supplies the electric current corresponding to the difference between the first and second driving currents to the light-emitting device unit 852 which is flowed through by the second driving current being larger than the first driving current. Further, since the electric current value supplied by the current adding circuit 150 is small, the current adding circuit 150 can be implemented with a relatively simple configuration, so that electric power consumption of the circuit of the current adding circuit 150 itself is small.

Therefore, the power circuit 100 can supply electric power simultaneously to plural load circuits (the light-emitting device units) having different driving currents, so that different from a conventional configuration using plural constant current driving circuits or a configuration in which each electric current from one power source circuit to plural load circuits is limited by resistance, it is possible to reduce the number of components, decrease the manufacturing cost, increase the reliability, and further improve the power efficiency.

The controlling circuit 114 adjusts the electric power to be supplied to the first winding (the primary winding L64), thereby adjusting the voltage generated by the voltage generating circuit 111.

According to the power circuit 100 of the present embodiment, a non-insulated power source such as a buck converter is used as the constant current circuit 110. By replacing the choke coil used for the non-insulated power source with the transformer T60, the current adding circuit 150 can obtain energy from the secondary winding L62. Therefore, it is possible to reduce the member of components of the power circuit 100, decrease the manufacturing cost, increase the reliability, and further improve the power efficiency of the power circuit 100. Further, in the present embodiment, the configuration employing non-insulated buck converter has been explained; however, the configuration can be formed in another way using an insulated flyback converter or a forward converter which is insulated by transformer.

In the power circuit 100 of the present embodiment, the voltage generating circuit 111 includes the first capacitor (the smoothing capacitor C14), and applies the voltage generated between both ends of the first capacitor (the smoothing capacitor C14) to the series load circuits.

The first capacitor (the smoothing capacitor C14) is charged by the electric current flowing through the first winding (the primary winding L64).

According to the power circuit 100 of the present embodiment, the first capacitor is charged by the electric current flowing through the first winding of the transformer T60, and thus by adjusting the electric power supplied to the first winding, the series load circuit (the light-emitting device series circuit) can be driven with the first driving current.

In the power circuit 100 according to the present embodiment, the current adding circuit 150 includes the second capacitor (the smoothing capacitor C52) and the current limiting circuit 155, and supplies the electric current which discharges the second capacitor (the smoothing capacitor C52) to the second load circuit (the light-emitting device unit 852).

The second capacitor (the smoothing capacitor C52) is charged by the electric current flowing through the second winding (the secondary winding L62).

The current limiting circuit 155 limits the electric current which discharges the second capacitor (the smoothing capacitor C52).

According to the power circuit 100 of the present embodiment, the current adding circuit 150 supplies only deficient current (a difference between the second driving current and the first driving current) to the second driving current required by the second load circuit (the light-emitting device unit 852). Since it is sufficient that output voltage and output current of the current adding circuit 150 are small, even if the current adding circuit 150 is formed by a relatively simple configuration, such a configuration does not largely decrease the electric power efficiency of the power circuit 100 as a whole. Therefore, the power circuit 100 can be formed by one constant current circuit and a simple circuit which supplies deficient current, so that different from the conventional configuration using plural constant current driving circuits or the configuration in which each electric current from one power source to plural load circuits is limited by resistance, it is possible to drive plural load circuits having different driving currents without decreasing the electric power efficiency, and also to reduce the number of components, decrease the size of the circuit, and increase the reliability.

The illumination apparatus 800 of the present embodiment includes the power circuit 100, the first light-emitting device unit 851, and the second light-emitting device unit 852.

The first light-emitting device unit 851 includes one or plural first light-emitting devices electrically connected in series, and is electrically connected to the power circuit 100 as the first load circuit.

The first light-emitting device emits light by the first driving current.

The second light-emitting device unit 852 includes one or plural second light-emitting devices electrically connected in series, and is electrically connected to the power circuit 100 as the second load circuit.

The second light-emitting device emits light by the second driving current.

According to the illumination apparatus 800 of the present embodiment, since plural light-emitting device units 851, 852 having different driving currents are made emit light, it is possible to emit light having high color rendering properties and desired color temperature.

The illumination apparatus 800 which has been explained includes the light-emitting device series circuit (the series load circuit) and the power circuit 100.

The light-emitting device series circuit includes the first and the second light-emitting device units 851 and 852 which are connected in series. The first light-emitting device unit 851 includes one or plural first light-emitting devices connected in series. The second light-emitting device unit 852 includes one of plural second light-emitting devices connected in series having larger driving current than the first light-emitting device.

The power circuit 100 includes the transformer T60 having the first winding (the primary winding L64) and the second winding (the secondary winding L62).

The light-emitting device series circuit is connected to the first winding of the transformer T60 and is driven with the first driving current $I_1$ supplied from the first winding.

The second light-emitting device unit 852 is connected to the second winding of the transformer T60 and is supplied with additive current $\Delta I$, and is driven with the second driving current $I_2$ which is made by adding the additive current $\Delta I$ to the first driving current $I_1$.

According to the illumination apparatus 800 which has been explained, even if the light-emitting diodes having different necessary driving currents are driven, it is not necessary to provide plural DC/DC converters for constant current driving to the secondary side of the constant voltage driving circuit for respective use. One power circuit 100 made by combining one constant current driving circuit (the constant current circuit 110) and a simple circuit (the current adding circuit 150) for supplying additive current can drive plural different types of light-emitting diodes and obtain necessary light-emitting output for each.

In the current adding circuit 150, output voltage is low and output current is also small. Therefore, even if the current adding circuit 150 is implemented by a very simple configuration in which the output current is limited by the current limiting resistance R53, etc. without feedback control, etc., the power efficiency is not decreased much; oil the contrary, it is rather advantageous that the reduction of the number of components enables to decrease the manufacturing cost and to improve the reliability.

In the configuration in which plural light-emitting device units are connected in parallel, instead of providing plural DC/DC converters for driving constant current, another configuration can be considered, in which an output is separated from the output from one DC/DC converter using the current limiting resistance. In case of such a configuration, since the voltage between both ends of the current limiting resistance R53 is high, the power loss of the current limiting resistance R53 increases, and the electric efficiency is decreased.

On the other hand, in the illumination apparatus 800 which has been explained, since the apparatus obtains energy from the secondary winding L62 of which the number of turns is smaller than the primary winding L64 and charges the smoothing capacitor C52, the voltage between both ends of the smoothing capacitor C52 is lower than the voltage between both ends of the smoothing capacitor C14. Accordingly, the voltage between both ends of the current limiting resistance R53 is low, the electric loss at the current limiting resistance R53 is small, and the electric efficiency is high.

Here, it is assumed that the turn ratio of the number of turns of the secondary winding L62 to the number of turns of the primary winding L64 should be equal to or greater than a ratio of the voltage between both ends of the light-emitting device unit 852 to the voltage between both ends of the series load circuit as a whole.

Here, the light-emitting device of the light-emitting device units 851 and 852 is not limited to a white light-emitting diode or a red light-emitting diode, but can be a light-emitting diode of another color, and also another type of light-emitting device such as an organic EL device, etc. Further, the number of light-emitting devices which form one light-emitting device unit can be an arbitrary number. Further, a connecting order of plural light-emitting device units can be an arbitrary order. One light-emitting device unit can include mixed different types of light-emitting devices as long as their driving currents are the same.

The current limiting circuit 155 is not limited to the current limiting resistance R53, the variable resistance R54, or the constant current circuit, but can be another configuration to limit electric current.

In the illumination apparatus 800 which has been explained, the power circuit 100 includes the current detecting circuit 112, the current limiting circuit 155, and the controlling circuit 114.

The current detecting circuit 112 detects the first or the second driving current.

The second light-emitting device unit 852 is connected to the second winding (the secondary winding L62) of the transformer T60 through the current limiting circuit 155, and is supplied with the additive current ΔI. The additive current ΔI is limited by the current limiting circuit 155. The controlling circuit controls the first or the second driving current to a predetermined current (the target current value) by controlling electric power to supply to the first winding (the primary winding L64) of the transformer T60 based on the first or the second driving current.

Here, the current detecting circuit 112 is not limited to the resistance R21, but can be another configuration to detect the electric current.

The controlling circuit 114 can be formed using an integrator, an analog multiplier, an IC, or a microcomputer, etc. instead of the differential amplifier A42.

The constant current circuit 110 is not limited to the configuration explained above, but can be another configuration such as a driving circuit as long as the circuit can control the output.

The current adding circuit 150 is not limited to the flyback system configuration explained above, but can be another configuration such as forward system configuration, etc.

Further, the configuration may use a rectifying circuit of synchronous rectifying system in which active control of opening/closing of the switching device such as MOSFET being provided instead of the rectifying device D13 or D51, is performed in synchronization with opening/closing of the switching device Q12.

According to the illumination apparatus 800 which has been explained, the power circuit 100 configured by one constant current driving circuit (the constant current circuit 110) and a simple circuit (the current adding circuit 150) for adding deficient current, can drive plural light-emitting diodes having different driving currents.

Further, since the number of components can be reduced, the component cost can be decreased, the mounting cost of the components can be decreased, and the circuit size can be reduced.

Further, if the type or the number of light-emitting devices to be driven is increased, it is possible to suppress the increase of the cost for the driving circuit.

Further, by configuring the circuit simply, the member of the components can be reduced. Therefore, the reliability can be improved.

Further, in the present embodiment, in order to drive plural light-emitting diodes having different driving currents, it is unnecessary to provide plural constant current driving circuits. Since the configuration can be formed by one constant current driving circuit and a simple circuit, the power loss can be decreased, and the electric efficiency can be improved.

Further, since the secondary winding L62 (the second winding) provided separately from the primary winding L64 (the first winding) supplies deficient current which is obtained by subtracting the first driving current from the electric current necessary for the light-emitting device units 852 (the electric current being a difference between the second driving current and the first driving current), the loss at the current limiting resistance R53 (the current limiting circuit) can be small, further the power loss can be reduced, and the electric efficiency can be improved.

Further, it is difficult to form a DC/DC converter for constant current driving with small capacity and high efficiency for auxiliary light-emitting output which is small output; however, the driving circuit which has been explained has a simple configuration, improves the electric efficiency and contributes energy saving.

In particular, when the member of light-emitting devices (the light-emitting diodes for obtaining the main lighting output) which form the light-emitting device unit 851 is large and the number of light-emitting devices (the light-emitting diodes for obtaining the auxiliary lighting output) which form the light-emitting device unit 852 is small, the electric efficiency is further improved.

Further, the number of DC/DC converters for constant current driving which carries out the switching operation is reduced, thereby decreasing the noise.

In the illumination apparatus 800 which has been explained, the current detecting circuit 112 is a variable resistance R22.

Therefore, it is possible to change luminance of the light-emitting device of the light-emitting device units 851 and 852.

In the illumination apparatus 800 which has been explained, the current limiting circuit 155 is a variable resistance R54.

Therefore, it is possible to change luminance of the light-emitting device of the light-emitting device unit 852 and change the color temperature by a combination of plural light-emitting outputs.

Here, the current detecting circuit 112 and the current limiting circuit 155 can be formed by a digital potentiometer, a transistor, or others.

Using the constant current circuit using the three-terminal regulator 156, etc. as the current limiting circuit 155 prevents more than a predetermined current from flowing. Thus if, for example, the light-emitting device of the light emitting device unit 852 is faulty in a short circuit mode, the increase of the electric power loss of the electric current loop of the light-emitting device unit 852 can be suppressed, and it is possible to continue driving of only the light-emitting device of the light-emitting device unit 851. Therefore, blackout can be prevented, which enables to play a minimum role as an illumination apparatus, and thus the reliability is improved.

According to the power circuit related to the present invention, the constant current circuit supplies the first driving current to the series load circuit formed by connecting in series plural load circuits, and the current adding circuit supplies deficient current to one or some of the load circuits out of the plural load circuits. The constant current circuit with a high voltage supplying relatively large electric current is formed as a circuit configuration having a high power efficiency, and the current adding circuit with a low voltage supplying relatively small electric current is formed as a simple circuit configuration, and thus it is possible to increase the power efficiency of the power circuit driving plural load circuits having different driving currents, reduce the number of components, lower the manufacturing cost, and improve the reliability.

Conventionally, respective constant current driving circuits are necessary for load circuits having different driving currents. However, the present invention employs a system in which electric power obtained by the second winding of a transformer is supplied to the second load circuit through a current adding circuit which adds only deficient amount of current, so that the load circuits having different driving currents can be driven by one power circuit at the same time, which improves the power efficiency of the power circuit and downsizes the circuit.

The controlling circuit controls the output voltage of the voltage generating circuit so that the driving current flowing through the series load circuit becomes the desired current value, thereby enabling to drive the series load circuit with constant current.

Charging the first capacitor once smoothes the output voltage of the voltage generating circuit and reduces the voltage variation and noise, thereby reducing the variation of the voltage to be applied to the series load circuit, and the voltage generating circuit can apply the output voltage to pass the constant current through the series load circuit.

Charging the second capacitor by the electric current from the second winding enables to apply the smoothed voltage to the current limiting circuit, so that the current adding circuit can supply deficient current to the second load circuit.

Within a range in which the voltage detected by the voltage detecting circuit becomes equal to or less than a predetermined voltage value, the series load circuit is driven with constant current, so that even if the light-emitting device becomes faulty (open fault), it is possible to prevent the output voltage of the voltage generating circuit from being greater than the predetermined voltage value.

Embodiment 2

The second embodiment will be explained with reference to FIG. 6.

Here, the same signs are assigned to components common with the first embodiment, and their explanation will be omitted.

Figure 6:
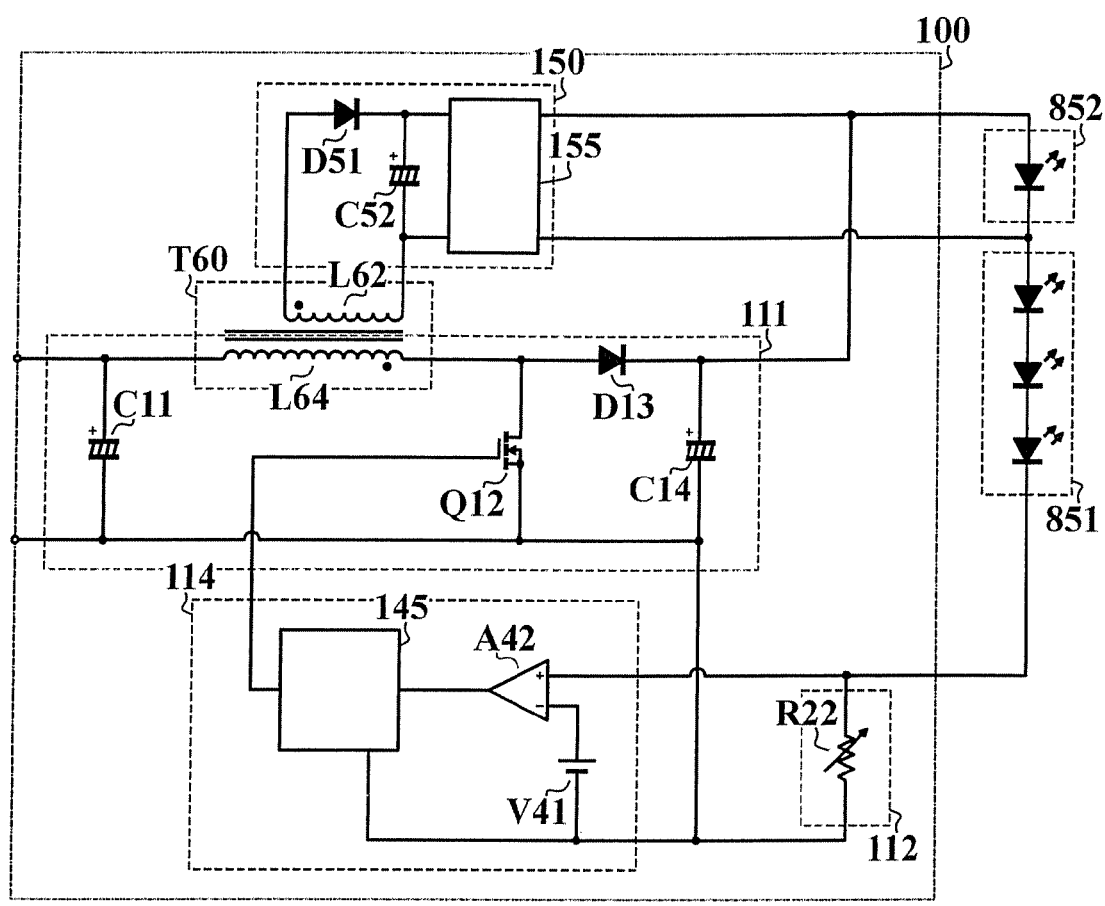
FIG. 6 is an electric circuit diagram showing a circuit configuration of a power circuit 100 according to the second embodiment.

FIG. 6 is an electric circuit diagram showing one example of a circuit configuration of a power circuit 100 according to the present embodiment.

A voltage generating circuit 111 is, for example, a boost converter (a step-up chopper circuit). The voltage generating circuit 111 includes an input capacitor C11, a primary winding L64 of the transformer T60, a switching device Q12, a rectifying device D13, and a smoothing capacitor C14. The voltage generating circuit 111 inputs direct voltage or pulsating flow voltage, and generates raised voltage.

The input capacitor C11 is electrically connected between input terminals of the voltage generating circuit 111. One end of the primary winding L64 is electrically connected to a positive terminal of the input capacitor C11. The switching device Q12 opens/closes according to a signal showing an instruction from the controlling circuit 114. The switching device Q12 is electrically connected between the other end of the primary winding L64 and a negative terminal of the input capacitor C11. An anode terminal of the rectifying device D13 is electrically connected to a connecting point of the primary winding L64 and the switching device Q12. The smoothing capacitor C14 is electrically connected between the cathode terminal of the rectifying device D13 and the negative terminal of the input capacitor C11. The voltage generating circuit 111 outputs a voltage between both ends of the smoothing capacitor C14. The positive terminal of the smoothing capacitor C14 is electrically connected to a terminal of a positive side of the series load circuit (a terminal of a positive side of the light-emitting device unit 852). A negative terminal of the smoothing capacitor C14 is electrically connected to a terminal of a negative side of the series load circuit (a terminal of a negative side of the light-emitting device unit 851). Therefore, the voltage generated between both ends of the smoothing capacitor C14 is applied to the series load circuit.

Here, an order to connect the light-emitting device units 851 and 852 in the series load circuit can be arbitrary. Like this example, the light-emitting device unit 852 can be the positive side, and the light-emitting device unit 851 can be the negative side; on the contrary, like the first embodiment, the light-emitting device unit 851 can be the positive side, and the light-emitting device unit 852 can be the negative side.

The current detecting circuit 112 includes a variable resistance R22. By changing a resistance value of the variable resistance R22, it is possible to change voltage generated between both ends of the current detecting circuit 112 with respect to the electric current detected by the current detecting circuit 112. Namely, if the resistance value of the variable resistance R22 is made large, the current detection voltage generated by the current detecting circuit 112 with respect to the same electric current becomes large; on the contrary, if the value of the variable resistance R22 is made small, the current detection voltage generated by the current detecting circuit 112 with respect to the same electric current becomes small. Therefore, when the resistance value of the variable resistance R2 is made large, the controlling circuit 114 controls the voltage generating circuit 111 so that less electric current flows through the series load circuit; on the contrary, when the resistance value of the variable resistance R22 is made small, the controlling circuit 114 controls the voltage generating circuit 111 so that more electric current flows through the series load circuit. By this operation, it is possible to adjust the brightness of the light-emitting device units 851 and 852.

When the switching device Q12 turns ON, almost same voltage as the voltage between both ends of the input capacitor C11 is applied between both ends of the primary winding L64. The electric current flows through the primary winding L64 from the left to the right, and the electric current increases. At this time, an inverse voltage is generated between both ends of the secondary winding L62, and thus the electric current does not flow through the secondary winding L62 because of the operation of the rectifying device D51.

When the switching device Q12 turns OFF, the rectifying device D13 turns ON to maintain the magnetic flux, the electric current flowing through the primary winding L64 is maintained, and charges the smoothing capacitor C14 though the rectifying device D13. At this time, a voltage which corresponds to a difference between the voltage between both ends of the smoothing capacitor C14 and the voltage between both ends of the input capacitor C11 is applied between both ends of the primary winding L64. If the voltage between both ends of the smoothing capacitor C14 is higher, the electric current flowing through the primary winding L64 decreases. At this time, a voltage of the opposite polarity is generated between both ends of the secondary winding L62. The voltage generated between both ends of the secondary winding L62 is higher than the voltage between both ends of the smoothing capacitor C52, the rectifying device D51 turns ON, the electric current flows through the secondary winding L62, and charges the smoothing capacitor C52. Thereafter, the electric current flowing through the secondary winding L62 also decreases.

By repeating the above operation, energy is transmitted from the primary side to the secondary side of the transformer T60.

A voltage having a voltage value obtained by multiplying a turn ratio of the secondary winding L62 and the primary winding L64 to the difference between the voltage between both ends of the smoothing capacitor C14 and the voltage between both ends of the input capacitor C11 is charged to the smoothing capacitor C52.

In this way, even if the boost converter is used as the voltage generating circuit 111, it is possible to obtain a similar effect as the first embodiment, such as downsizing the circuit, reducing the manufacturing cost, increasing the electric power efficiency, improving the reliability, and so on.

The voltage generating circuit 111 is not limited to be the buck converter or the boost converter which has been explained, but can be non-insulated DC/DC converter with another configuration having a choke coil and other circuits. By providing the secondary winding to the choke coil of the voltage generating circuit 111, the current adding circuit 150 obtains energy from the secondary winding and generates electric current to be supplied to the light-emitting device unit 852.

Further, the voltage generating circuit 111 can be an insulated DC/DC converter which originally includes a transformer.

Embodiment 3

The third embodiment will be explained with reference to FIGS. 7 through 9.

Here, the same signs are assigned to components common with the first embodiment, and their explanation will be omitted.

Figure 7:
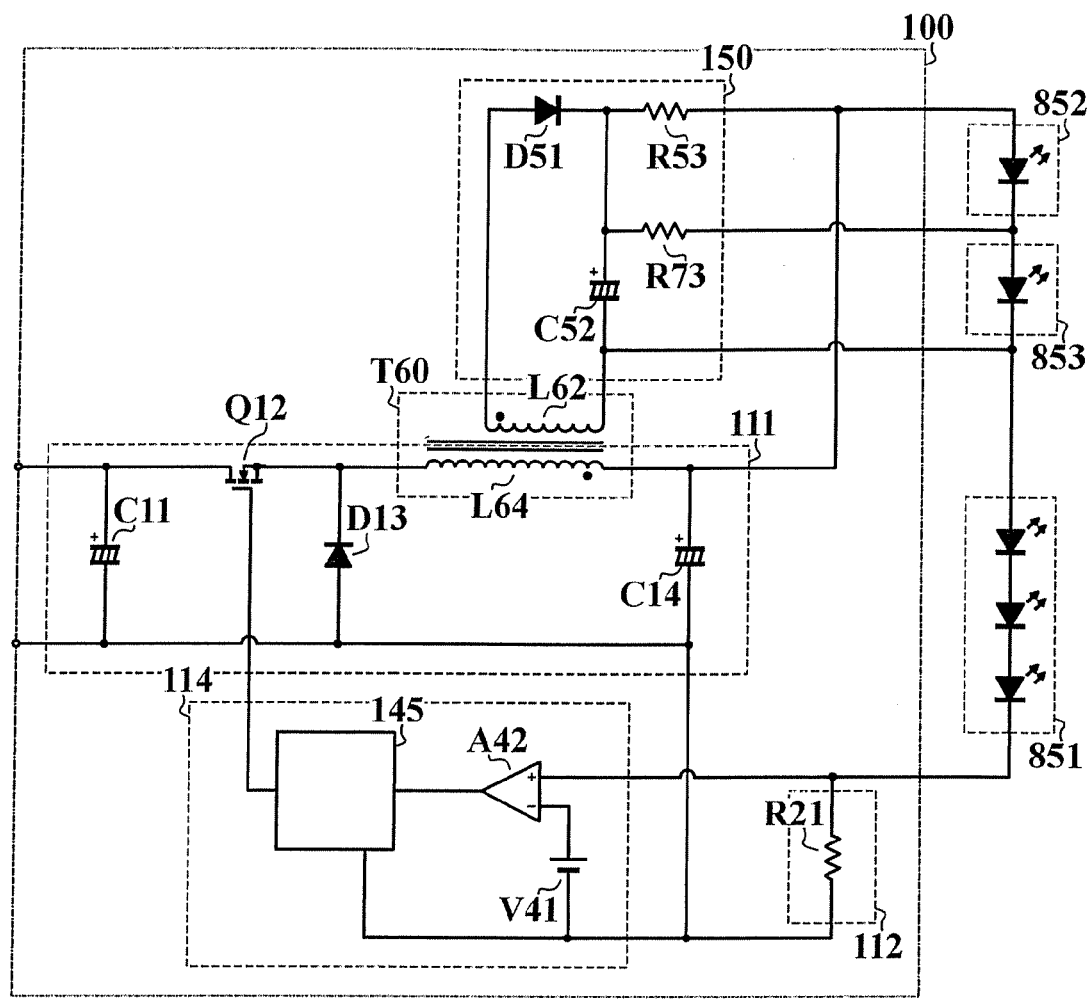
FIG. 7 is an electric circuit diagram showing a circuit configuration of a power circuit 100 according to the third embodiment.

FIG. 7 is an electric circuit diagram showing one example of a circuit configuration of a power circuit 100 according to the present embodiment.

An illumination apparatus 800 includes three light-emitting device units 851 through 853. Among the three light-emitting device units, the light-emitting device unit 851 has the least driving current, the light-emitting device unit 852 has secondarily least, and the light-emitting device unit 853 has the largest driving current.

A series load circuit is a circuit formed by electrically connecting the three light-emitting device units 851 through 853 in series. In this example, the three light-emitting device units 851 through 853 are connected in an order of the light-emitting device unit 852, the light-emitting device unit 853, and the light-emitting device unit 851 from the positive side. However, the connecting order is not limited to this, but can be arbitrary.

A current adding circuit 150 includes two outputs. In addition to the configuration explained in the first embodiment, the current adding circuit 150 further includes a current limiting resistance R73. One end of the current limiting resistance R73 is electrically connected to a positive terminal of a smoothing capacitor C52. The other end of the current limiting resistance R73 is electrically connected to a terminal of a positive side of the light-emitting device unit 853. A negative terminal of the smoothing capacitor C52 is electrically connected to a terminal of a negative side of the light-emitting device unit 853.

The electric current supplied from a voltage generating circuit 111 is the first driving current. This current passes through the light-emitting device unit 852, the light-emitting device unit 853, the light-emitting device unit 851, and the current detecting circuit 112 and returns to the voltage generating circuit 111.

The electric current supplied through the current limiting resistance R53, among the electric currents supplied from the current adding circuit 150, is a difference between the second driving current which is necessary for the light-emitting device unit 852 and the first driving current. This current passes through the light-emitting device unit 852 and the light-emitting device unit 853 and returns to the current adding circuit 150.

The electric current supplied through the current limiting resistance R73, among the electric currents supplied from the current adding circuit 150, is a difference between the third driving current which is necessary for the light-emitting device unit 853, and the second driving current. This current passes through the light-emitting device unit 853 and returns to the current adding circuit 150.

Namely, the light-emitting device unit 851 and the current detecting circuit 112 are flowed through by only the electric current supplied from the voltage generating circuit 111 (the first driving current). The light-emitting device unit 852 is flowed through by the electric current (the second driving current) made by combining the electric current supplied from the voltage generating circuit 111 (the first driving current) and the electric current supplied from the current adding circuit 150 through the current limiting resistance R53 (a difference obtained by subtracting the first driving current from the second driving current). The light-emitting device unit 853 is flowed through by the electric current (the third driving current) made by combining further the electric current (a difference obtained by subtracting a sum of the electric current supplied through the resistance R53 and the first driving current (the second driving current) from the third driving current) supplied through the current limiting resistance R73 with the above current.

Here, the current adding circuit 150 can be formed to include two current limiting circuits 155 instead of the two current limiting resistances R53 and R73.

In this way, by forming the current adding circuit 150 to include plural current limiting circuits, plural outputs can be provided. Therefore, it is possible to supply the desired driving current to at least three load circuits having different driving currents with each other.

Figure 8:
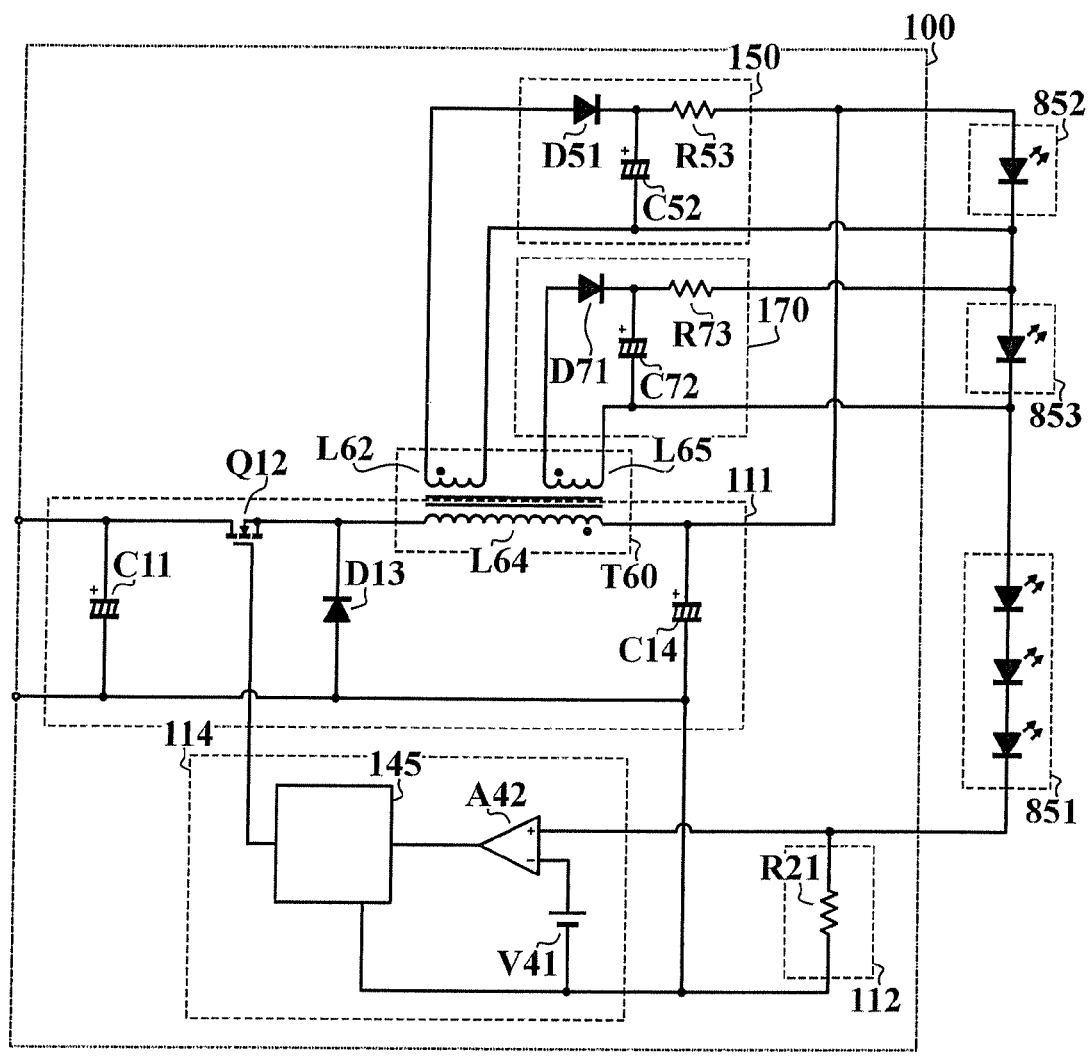
FIG. 8 is an electric circuit diagram showing a deformed example of the power circuit 100 according to the third embodiment.

FIG. 8 is an electric circuit diagram showing a deformed example of a power circuit 100 according to the present embodiment.

The power circuit 100 includes the constant current circuit 110, current adding circuits 150 and 170. The transformer T60 includes the primary winding L64, and two secondary windings L62 and L65.

The current adding circuit 150 generates electric current to be supplied to the light-emitting device unit 852 from the electric current flowing through the secondary winding L62. The current adding circuit 150 includes a rectifying device D51, a smoothing capacitor C52, and a current limiting resistance R53. The current adding circuit 150 can include a current limiting circuit instead of the current limiting resistance R53.

The current adding circuit 170 generates electric current to be supplied to the light-emitting device unit 853 from the electric current flowing through the secondary winding L65. The current adding circuit 170 includes a rectifying device D71, a smoothing capacitor C72, and a current limiting resistance R73. The current adding circuit 170 can include a current limiting circuit instead of the current limiting resistance R73.

In this example, the light-emitting device unit 851 is flowed through by only the electric current supplied from the voltage generating circuit 111. The light-emitting device unit 852 is flowed through by the electric current made by combining the electric current supplied from the voltage generating circuit 111 and the electric current supplied from the current adding circuit 150. The light-emitting device unit 853 is supplied with the electric current made by combining the electric current supplied from the voltage generating circuit 111 and the electric current supplied from the current adding circuit 170 is supplied. Accordingly, more electric current flows through the light-emitting device units 852 and 853 than in the light-emitting device unit 851. Either of the electric current flowing through the light-emitting device unit 852 and the electric current flowing through the light-emitting device unit 853 can be larger.

Figure 9:
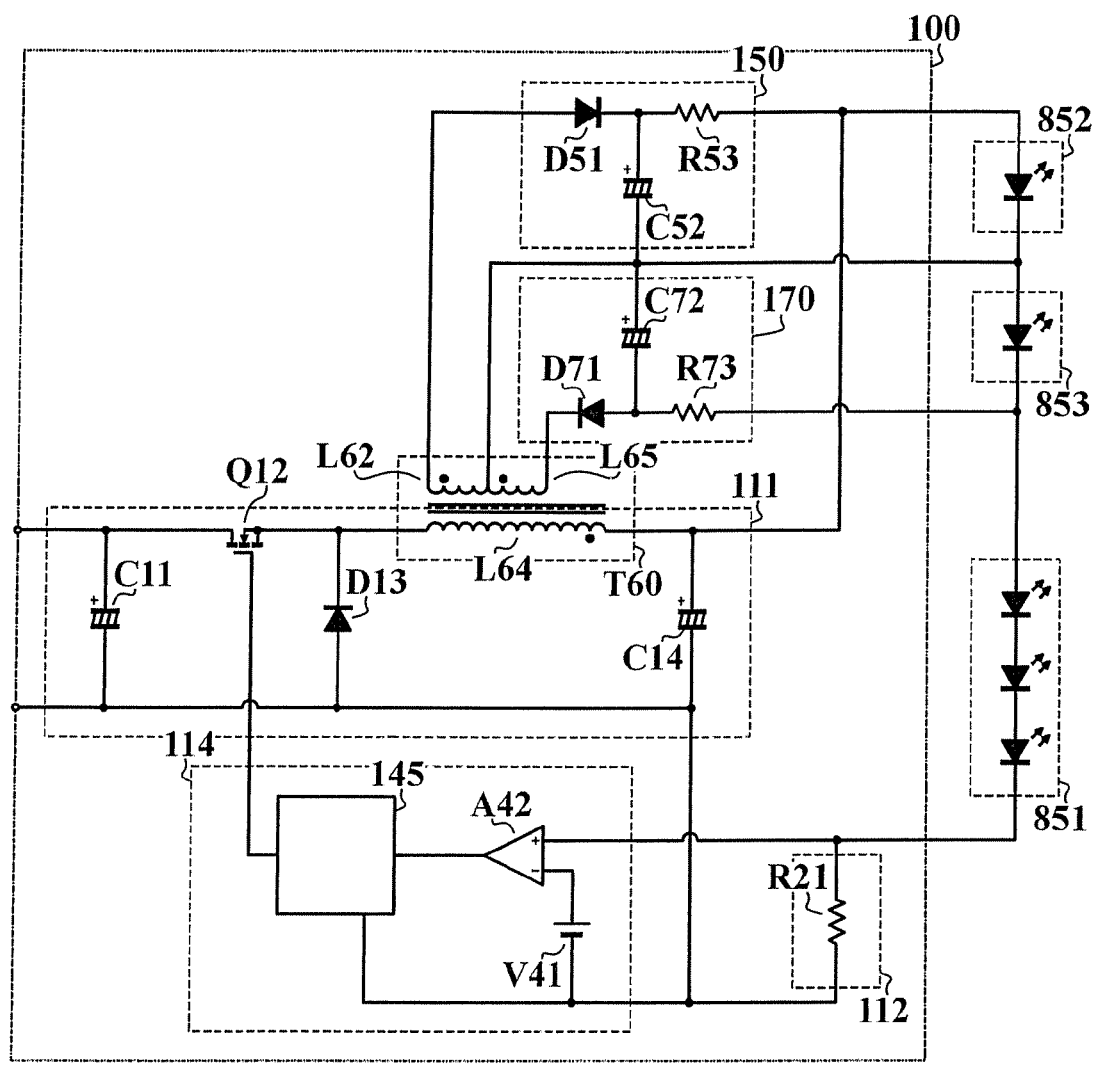
FIG. 9 is an electric circuit diagram showing another deformed example of the power circuit 100 according to the third embodiment.

FIG. 9 is an electric circuit diagram showing another deformed example of a power circuit 100 according to the present embodiment.

The power circuit 100 includes a constant current circuit 110, and current adding circuits 150 and 170. A transformer T60 includes a primary winding L64, and a secondary winding having an intermediate terminal (an intermediate tap). Within the secondary winding, a part between one end to the intermediate terminal is called as a secondary winding L62, and a part between the intermediate terminal to the other end is called as a secondary winding L65. The number of turns of the secondary winding L62 and the one of the secondary winding L65 can be either the same or different.

The current adding circuit 150 generates electric current to be supplied to the light-emitting device unit 852 from the electric current flowing through the secondary winding L62.

The current adding circuit 170 generates electric current to be supplied to the light-emitting device unit 853 from the electric current flowing though the secondary winding L65.

In this way, instead of providing two secondary windings to the transformer T60, one secondary winding having the intermediate terminal can be provided.

Here, the current adding circuit 150 or the current adding circuit 170 can be connected between the one end of the secondary winding and the intermediate terminal, but can be connected to both ends of the secondary winding.

As has been discussed, by taking plural outputs from one current adding circuit 150 or providing plural current adding circuits having a simple configuration, it is possible to light three or more light-emitting device units 851 through 853 having different driving currents with each other.

In the illumination apparatus 800 which has been explained, the second light-emitting device units 852 and 853 are connected in series.

Plural current limiting circuits (the current limiting resistances R53 and R73) are provided corresponding to the second light-emitting device units 852 and 853.

In the illumination apparatus 800 which has been explained, the second light-emitting device units 852 and 853 are connected in series.

Plural second windings (the secondary windings L62 and L65) of the transformer T60 and plural current limiting circuits (the current limiting resistances R53 and R73) are provided corresponding to the second light-emitting device units 852 and 853.

The second light-emitting device units 852 and 853 are respectively connected to the second windings through the current limiting circuits.

Therefore, it is possible to drive plural light-emitting diodes of different types using one power circuit 100 formed by combining the constant driving current circuit (the constant current circuit 110) and a simple circuit for supplying additive current (the current adding circuits 150 and 170), thereby obtaining emitting output necessary for each.

Further, if the type and the number of the light-emitting devices are increased, it is possible to suppress the increase of the cost for the driving circuit.

Here, the light-emitting device of the light-emitting device unit 852 and the light-emitting device of the light-emitting device unit 853 can be either of the same type or different types. Further, the number of the light-emitting devices which form each light-emitting device unit can be two or more.

As discussed, the series load circuit (the light-emitting device series circuit) can be formed by connecting in series three or more light-emitting device units 851 through 853 having different driving currents with each other. By combining three or more types of light-emitting devices having different light-emitting outputs, the range of creatable color temperature can be wider, which enables to create various colors and shades.

Further, by using the secondary winding having the intermediate terminal, the number of wirings can be reduced, which enables to form the circuit with a low cost and small size.

Embodiment 4

The fourth embodiment will be explained with reference to FIG. 10.

Here, the same signs are assigned to the components common with the first embodiment, and their explanation will be omitted.

Figure 10:
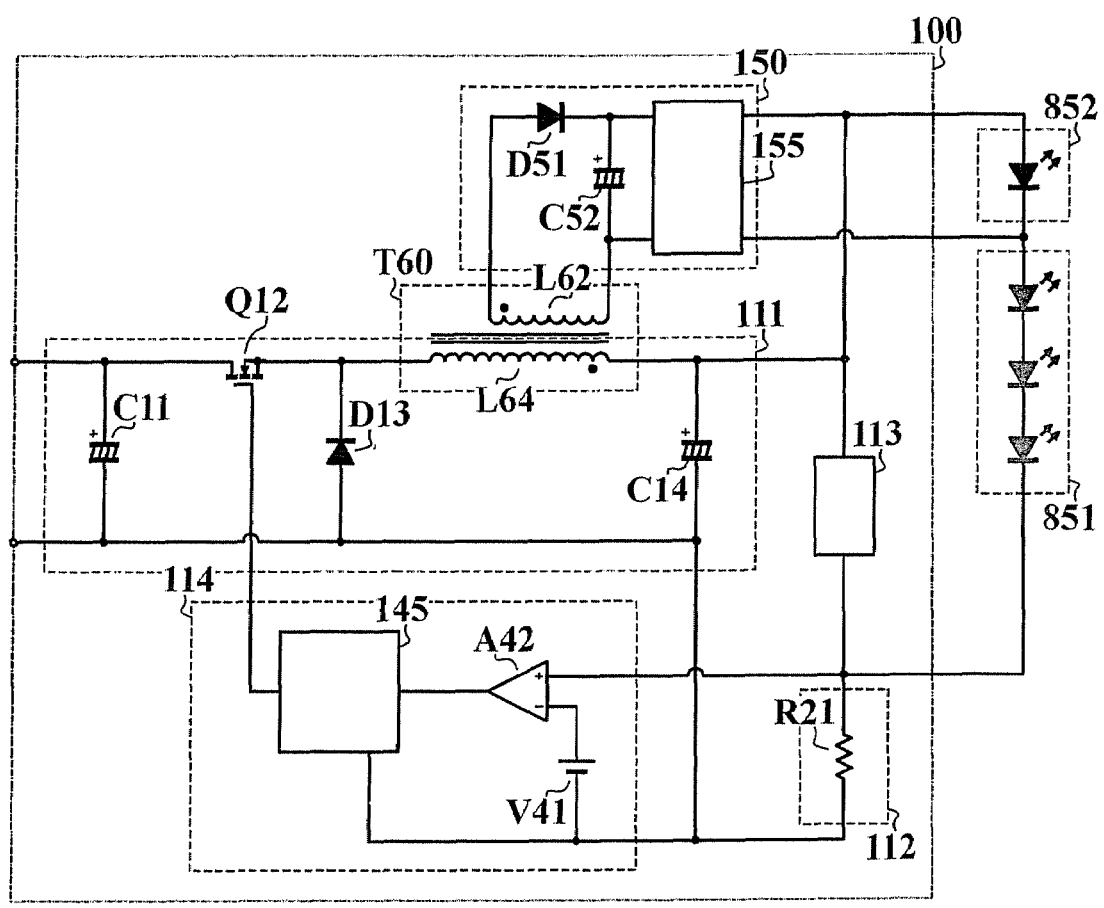
FIG. 10 is an electric circuit diagram showing a circuit configuration of a power circuit 100 according to the fourth embodiment.

FIG. 10 is an electric circuit diagram showing one example of a circuit configuration of a power circuit 100 according to the present embodiment.

The power circuit 100 includes a voltage detecting circuit 113 in addition to the configuration which has been explained in the first embodiment.

The voltage detecting circuit 113 is electrically connected to the series load circuit in parallel. Here, the voltage detecting circuit 113 can be electrically connected in parallel to the light-emitting device unit 851 or the light-emitting device unit 852 instead of the series load circuit. The load circuit to which the voltage detecting circuit 113 is electrically connected in parallel is called as a voltage detection target circuit. The voltage detecting circuit 113 detects a voltage between both ends (voltage value information) of the voltage detection target circuit.

The voltage detecting circuit 113 is, for example, resistance, and electric current correlated to the voltage between both ends flows through it. The volt-ampere characteristic of the voltage detecting circuit 113 can be that the electric current proportionate to the voltage between both ends flows like the resistance, and can be also that if the voltage between both ends is a predetermined threshold value or less, the electric current hardly flows, but the electric current flows if the voltage between both ends exceeds the threshold value. The electric current flowing through the voltage detecting circuit 113 is called voltage detection current.

A current detecting circuit 112 detects electric current made by combining the electric current flowing though the current detection target circuit and the voltage detection current flowing through the voltage detecting circuit 113.

When the forward voltage of the light-emitting device unit 851 or 852 increases because of decrease of ambient temperature and so on, the electric current detected by the current detecting circuit 112 decreases. A controlling circuit 114 raises voltage generated by a voltage generating circuit 111. Since the voltage detected by the voltage detecting circuit 113 is raised, the voltage detection current flowing through the voltage detecting circuit 113 increases. When the electric current detected by the current detecting circuit 112 reaches the target current value, the electric current flowing through the current detection target circuit decreases with an increased amount of the voltage detection current.

Since the forward voltage of the light-emitting device unit 851 or 852 increases, if the value of the flowing electric current is the same, the consumption power increases in the light-emitting device unit 851 or 852. Because of the operation of the voltage detecting circuit 113, the electric current flowing through the light-emitting device units 851 and 852 decreases, which enables to suppress increase of the consumption power of the light-emitting device units 851 and 852.

Further, there may be a case in which however high the voltage generated by the voltage generating circuit 111 is raised, the electric current flowing through the current detection target circuit does not reach the target current value such as a case of disconnection fault of the light-emitting device unit 851 or 852. In such a case, when the increase of the electric current flowing through the voltage detecting circuit 113 makes the total electric current reach the target current value, the controlling circuit 114 stops increasing the voltage generated by the voltage generating circuit 111 further. Therefore, it is possible to prevent failure of the power circuit 100 and the light-emitting device units 851 and 852 because of excessive voltage, and to improve the reliability.

Illumination apparatus employing either one of the power circuits that have been discussed in the foregoing first through fourth embodiments can drive plural light-emitting device units having different driving currents at the same time.

Having thus described several particular embodiments of the present invention, various alterations, modifications, and improvements will readily occur to those skilled in the art. Such alterations, modifications, and improvements are intended to be part of this disclosure, and are intended to be within the spirit and scope of the present invention. Accordingly, the foregoing description is by way of example only, and is not intended to be limiting. The present invention is limited only as defined in the following claims and the equivalents thereto.

The invention claimed is:

1. A power circuit for supplying electric power to a first load circuit driven with a first driving current and a second load circuit driven with a second driving current that is larger than the first driving current, the power circuit comprising a transformer, a constant current circuit, and a current adding circuit,
   wherein the transformer includes a first winding and a second winding;
   wherein the constant current circuit includes a voltage generating circuit, a current detecting circuit, and a controlling circuit, and supplies the first driving current to a series load circuit formed by electrically connecting the first load circuit and the second load circuit in series;
   wherein the current adding circuit obtains energy from electric current flowing through the second winding and supplies electric current having a current value corresponding to a difference between the first driving current and the second driving current to the second load circuit;
   wherein the voltage generating circuit obtains energy from electric current flowing through the first winding and generates voltage to be applied to the series load circuit;
   wherein the current detecting circuit treats either of the first load circuit and the second load circuit as a current detection target circuit and detects driving current flowing through the current detection target circuit; and
   wherein the controlling circuit controls the voltage generating circuit so that the driving current detected by the current detecting circuit becomes a predetermined current value.

2. The power circuit of claim 1 further comprising a voltage detecting circuit,
   wherein the voltage detecting circuit sets either of the first load circuit, the second load circuit, and the series load circuit as a voltage detection target circuit, and detects voltage generated between both ends of the voltage detection target circuit; and
   wherein the controlling circuit controls the voltage generating circuit so that the driving current detected by the current detecting circuit becomes the predetermined current value within a range in which the voltage detected by the voltage detecting circuit becomes equal to or less than a predetermined voltage value.

3. An illumination apparatus comprising the power circuit of claim 1, a first light-emitting device unit, and a second light-emitting device unit,
   wherein the first light-emitting device unit includes one first light-emitting device or a plurality of first light-emitting devices which are electrically connected in series, and is electrically connected to the power circuit as the first load circuit;
   wherein the first light-emitting device emits light by the first driving current;
   wherein the second light-emitting device unit includes one second light-emitting device or a plurality of second light-emitting devices which are electrically connected in series, and is electrically connected to the power circuit as the second load circuit; and
   wherein the second light-emitting device emits light by the second driving current that is larger than the first driving current.

4. The power circuit of claim 1, wherein the controlling circuit adjusts electric power to be supplied to the first winding, thereby adjusting the voltage generated by the voltage generating circuit, and controlling the driving current flowing through the current detecting circuit so as to become a predetermined current value.

5. The power circuit of claim 4,
wherein the voltage generating circuit includes a first capacitor and applies voltage generated between both ends of the first capacitor to the series load circuit, and
wherein the first capacitor is charged by the electric current flowing through the first winding.

6. The power circuit of claim 4,
wherein the current adding circuit includes a second capacitor and a current limiting circuit, and supplies electric current which discharges the second capacitor to the second load circuit;
wherein the second capacitor is charged by the electric current flowing through the second winding; and
wherein the current limiting circuit limits the electric current which discharges the second capacitor.

* * * * *